(12) United States Patent
Rajagopal et al.

(10) Patent No.: US 11,954,501 B2
(45) Date of Patent: Apr. 9, 2024

(54) APPARATUS AND METHOD FOR RESTORING A PASSWORD-PROTECTED ENDPOINT DEVICE TO AN OPERATIONAL STATE FROM A LOW POWER STATE

(71) Applicant: Intel Corporation, Santa Clara, CA (US)

(72) Inventors: Pannerkumar Rajagopal, Bangalore (IN); Bhavana Shankarappa, Mysore (IN); Kiran Mahesh Eriki, Tirupati (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/697,801

(22) Filed: Mar. 17, 2022

(65) Prior Publication Data
US 2022/0413876 A1  Dec. 29, 2022

(30) Foreign Application Priority Data
Jun. 23, 2021 (IN) .............................. 202141028118

(51) Int. Cl.
*G06F 9/44* (2018.01)
*G06F 9/4401* (2018.01)

(52) U.S. Cl.
CPC .................. *G06F 9/4411* (2013.01)

(58) Field of Classification Search
CPC .................................................. G06F 9/4411
See application file for complete search history.

(56) References Cited

U.S. PATENT DOCUMENTS

| 7,743,241 | B1* | 6/2010 | Moore | G06F 21/6209 713/161 |
|---|---|---|---|---|
| 2006/0200679 | A1* | 9/2006 | Hawk | G06F 21/31 713/184 |
| 2009/0036096 | A1* | 2/2009 | Ibrahim | H04L 9/3226 455/411 |
| 2013/0262872 | A1* | 10/2013 | Xu | G06F 21/34 713/183 |

* cited by examiner

*Primary Examiner* — Zahid Choudhury
(74) *Attorney, Agent, or Firm* — Schwabe, Williamson & Wyatt, P.C.

(57) ABSTRACT

A scheme for restoring a password-protected endpoint device (e.g., a memory device) of a computer system to an operational state from a low power state without requiring user input of a device password. A password received for unlocking the device during a boot process is stored in a secure memory. The password-protected endpoint device subsequently enters the low power state, causing it to lock. During a transition from the low power state to an operational state, it is detected that the password for the endpoint device is stored in the secure memory. The password is fetched from the secure memory and used to unlock the endpoint device, thereby restoring the endpoint device to an operational state.

20 Claims, 4 Drawing Sheets

APPARATUS AND METHOD FOR RESTORING A PASSWORD-PROTECTED ENDPOINT DEVICE TO AN OPERATIONAL STATE FROM A LOW POWER STATE

CROSS REFERENCE TO RELATED APPLICATIONS

The present application claims international priority under 35 U.S.C. § 119 to Indian Patent Application No. 202141028118, filed Jun. 23, 2021, entitled "APPARATUS AND METHOD FOR RESTORING A PASSWORD-PROTECTED ENDPOINT DEVICE TO AN OPERATIONAL STATE FROM A LOW POWER STATE", the entire content and disclosure of which is hereby incorporated by reference in its entirety.

BACKGROUND

The Modern Standby (formally Connected Standby) standard by Microsoft® is a specification for Window® 8 and later operating systems and platforms that enables an instant on/off user experience. Modern Standby allows systems and devices to enter low power states while remaining connected to a network. When a computer system enters a Modern Standby state, components and devices of the system are placed in an intermediate or low power state. An endpoint device, such as a memory device, may be placed in one of two low power states: D3hot (auxiliary power provided) or D3cold (no power provided) as defined by device power state of the Advanced Configuration and Power Interface (ACPI) specification.

Generally, a password is submitted to a password-protected endpoint device before the computer system completely boots up to unlock the device. If the endpoint device subsequently enters D3hot, it will remain unlocked. However, if the endpoint device subsequently enters D3cold, it will revert to a locked state.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
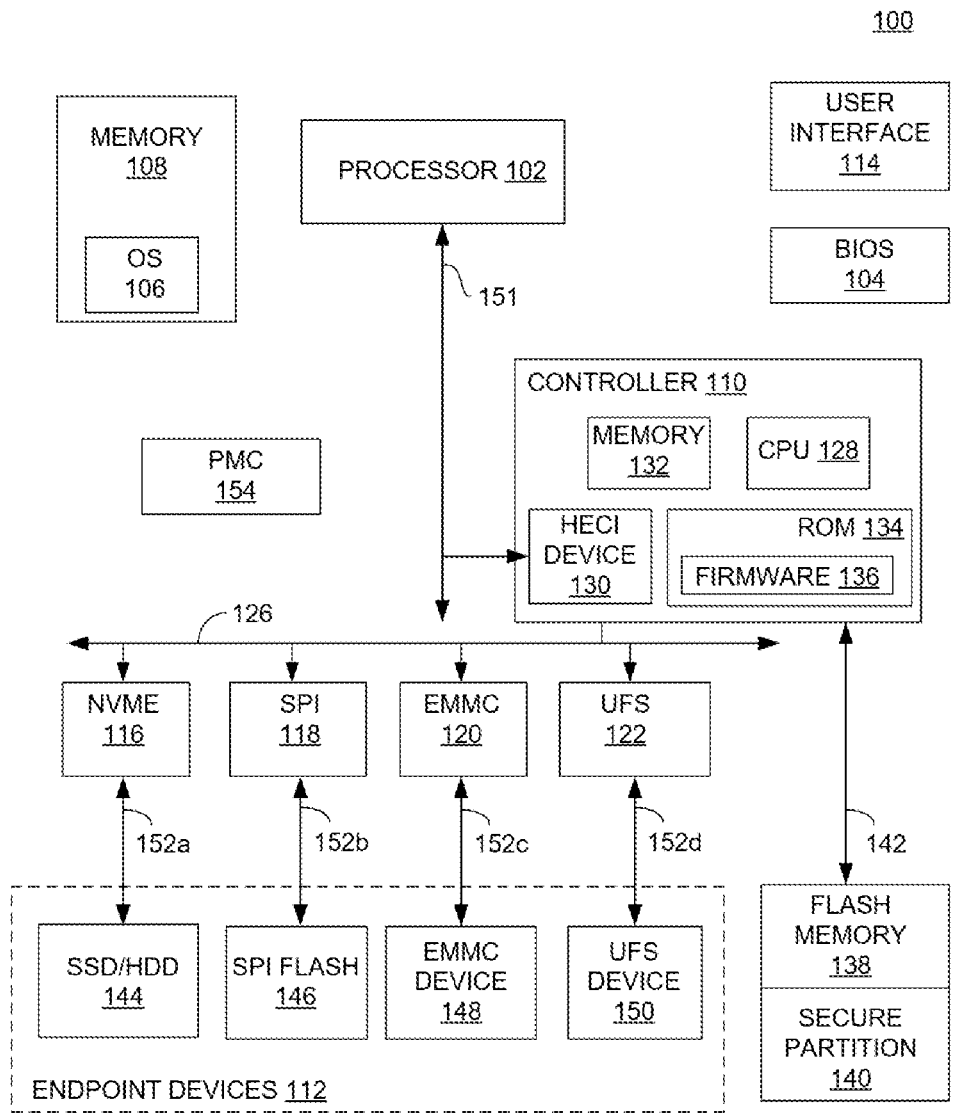
FIG. 1 illustrates some components of a computing system having a capability to restore a password-protected endpoint device to an operational state from a low power state in accordance with some embodiments.

Some embodiments describe techniques for restoring a password-protected endpoint device (e.g., a memory device) associated with a computer system to an operational state from a low power state. In some embodiments, a password-protected endpoint device locks when it is in a low power state. A password for the password-protected endpoint device is received from a user when the computer system boots up. The boot process uses the password to unlock the endpoint device, placing it in an operational state. The boot process also stores the password in a secure memory (e.g., serial peripheral interface (SPI) flash device). Subsequent to being unlocked (e.g., during the boot process), the endpoint device enters a low power state that causes the endpoint device to enter the locked state. In some embodiments, when power to the endpoint device is restored, the password is fetched from the secure memory and used to unlock the endpoint device, thereby restoring the endpoint device to an operational state without user input of the endpoint device password.

In some embodiments, an "endpoint device" is a device that is coupled with and provided power by the computer system. Examples of endpoint devices include memory devices, such as solid state or hard disk drives, flash memory devices, MultiMediaCard (MMC) devices, embedded MMC (eMMC) devices, and Universal Flash Storage (UFS) devices. Additional examples of endpoint devices include keyboards, touch pads, touch screens, cameras, microphones, display screens, monitors, and speakers.

In some embodiments, to extend battery life, save energy, and reduce heat, various power states may be defined for the computer system. For example, one or more working power states and one or more sleep power states may be defined in a power management scheme for the computer system. While various embodiments here are described with reference to device power states as defined by the Advanced Configuration and Power Interface (ACPI), the embodiments are not limited to such. For example, the embodiments are applicable to restoring a password-protected endpoint device to an active state from any low power state, such as a deep low power state.

There are many technical effects of various embodiments. For example, the apparatus and method for restoring a password-protected endpoint device to an operational state from a low power state allows an endpoint device to enter D3cold and allows the endpoint device to return to an operational state without requiring a user to re-enter a password, thereby saving power while enhancing functionality. In addition, when an endpoint device is allowed to enter D3cold, it permits various modules on an SoC or other Integrated Circuit (IC) to be placed in a deepest possible power state, thereby providing further power savings. Existing systems either support an endpoint device entering D3cold or password protection for an endpoint device, however, both features are not supported in the same system at the same time. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates a computing system 100 having a capability to restore a password-protected endpoint device to an operational state from a low power state in accordance with some embodiments. Computing system 100 comprises a processor 102, Basic Input/Output System (BIOS) 104, operating system (OS) 106, memory 108, controller 110, and endpoint devices 112. BIOS 104 is firmware which runs on the Processor 102. BIOS 104 is typically stored in SPI flash memory. BIOS 104 is responsible for booting up computing system 100. During boot, BIOS 104 is copied to Memory 108 and runs from there. According to some embodiments, BIOS 104 unlocks a password-protected endpoint device 112 during an early stage of the boot process. In some embodiments, BIOS 104 receives a password from a user interface 114 and provides the password to controller 110 during an early stage of the boot process.

In some embodiments, computing system 100 comprises Nonvolatile Memory Express (NVMe) controller 116, Serial Peripheral Interface (SPI) interface 118, Embedded Multimedia Card (eMMC) interface 120, and Universal Flash Storage (UFS) interface 122. In some embodiments, computing system 100 includes an internal bus 126. The internal bus 126 may couple controller 110 with the NVMe controller 116, SPI interface 118, eMMC interface 120, and UFS interface 122.

In various embodiments, controller 110 may be an embedded subsystem comprising a CPU 128, a Host Embedded Controller Interface (HECI) device 130, memory 132, and a ROM 134. Firmware 136 for the controller 110 may be stored in the ROM 134. HECI device 130 may be associated with a specific address in a memory mapped input/output (MMIO) address space. In some embodiments, controller 110 includes a flash memory 138 having a secure partition 140. In some embodiments, flash memory 138 may be internal to controller 110. In some embodiments, flash memory 138 may be external to controller 110 and accessed via a dedicated bus 142, as shown in FIG. 1. In some embodiments, flash memory 138 may be external to controller 110 with access via a bus that is shared with other devices or components. For example, controller 110 may access flash memory 138 via bus 126 in some embodiments.

In some embodiments, controller 110 provides a computing environment that is isolated from software executing on the processor 102, such as BIOS 104, OS 106, or application software. In various embodiments, the secure partition 140 is not accessible by BIOS 104, OS 106, or application software. While various embodiments employ controller 110 to use its secure memory partition 140 to store a password for an endpoint device 112, as well as to use the stored password to unlock the endpoint device 112, it will be appreciated that any suitable hardware-based device having logic or a processor for executing instructions to perform the operations described herein for restoring a password-protected endpoint device to an operational state from a low power state, and a secure memory storing a password for an endpoint device 112, may employed in other embodiments.

Endpoint devices 112 comprise storage devices in various embodiments. For example, endpoint devices 112 may comprise solid state or hard disk drives (SSD/HDD) 144, SPI flash memory 146, eMMC device 148, and UFS device 150. SSD/HDD 144 may be coupled with controller 110 via bus 152a. SPI flash memory 146 may be coupled with controller 110 via bus 152b. eMMC device 148 may be coupled with controller 110 via bus 152c. UFS device 150 may be coupled with controller 110 via bus 152d. In some embodiments, the busses 152a-152d may be a PCI Express (Peripheral Component Interconnect Express) bus. While storage devices are presented as examples of endpoint devices 112, it should be appreciated that in various embodiments any suitable device coupled with and provided power by a computer system may be used as an endpoint device in various embodiments. For example, endpoint devices 112 may include a keyboard, touch pad, touch screen, scanner, camera, microphone, display screen, monitor, or speaker. According to various embodiments, endpoint devices 144, 146, 148, and 150 are password protected. According to various embodiments, when endpoint devices 144, 146, 148, and 150 enter a low power state, they enter a locked state. Subsequently, when endpoint devices 144, 146, 148, and 150 are brought to a power state consistent with active operations, they remain in the locked state and do not enter an active or operational state until they are unlocked with a password.

In some embodiments, BIOS 104 and controller 100 employ a Host Embedded Controller Interface (HECI) bus 151 to provide computing system 100 with the capability to restore a password-protected endpoint device 112 to an operational or active state from a low power state. In particular, BIOS 104 may use HECI bus 151 to transmit a password for an endpoint device 112 to controller 110 at an early stage of the boot process. One of ordinary skill in the art will appreciate that HECI bus 151 is generally considered to be a secure channel. Any other secure channel can be used instead of HECI bus 151, in accordance with some embodiments. In some embodiments, HECI bus 151 can be accessed through dedicated MMIO and may only be accessed by BIOS 104 and controller 110. In some embodiments, HECI bus 151 may be accessed by BIOS 104, controller 110, and one or more other trusted components. While various embodiments employ HECI bus 151 as a secure channel for transmitting an endpoint device password from BIOS 104 to controller 110, in other embodiments any suitable secure channel may be used. For example, in some embodiments, an endpoint device password may be encrypted prior to transmission over a bus from BIOS 104 to controller 110.

In some embodiments, HECI device 130 may receive data transmitted on HECI bus 151 from BIOS 104. For example, HECI device 130 may receive an endpoint device password transmitted on HECI bus 151 by BIOS 104 during an early stage of a boot process. In some embodiments, firmware 136 includes instructions to receive or fetch the received endpoint device password from HECI device 130. In addition, in some embodiments, firmware 130 includes instructions to store the endpoint device password in secure partition 140 of flash memory 138. Further, in some embodiments, firmware 136 includes instructions to fetch the endpoint device password stored in secure partition 140 of flash memory 138 and transmit the fetched endpoint device password to an endpoint device 112. Firmware 136 may fetch the device password from secure memory and transmit the password to an endpoint device during a transition from a wake event to an operational or active state of computing system 100. In addition, during this transitional period, firmware 136 may detect that a password for endpoint device 112 is stored in secure memory 140, and fetch and transmit the password to endpoint device 112 in response to detecting that the password is present in secure memory 140. In some embodiments, firmware instructions 130 for transmitting the endpoint device password to endpoint device 112 may also include instructions to issue any commands required by endpoint device 112 to unlock the device. The logic that receives an endpoint device password transmitted on a bus, stores the endpoint device password in secure partition of memory, fetches the device password from secure memory and transmits the password to an endpoint device, or detects that a password for an endpoint device is stored in a secure memory, and fetches and transmits the password to an endpoint device in response to detecting that the password is present in the secure memory can be implemented in hardware, software, of a combination of them. In some embodiments, when the logic is implemented in hardware, it includes circuitries having active and/or passive devices coupled to implement the function of the logic.

In some embodiments, controller 110 employs bus 126 and one of the busses 152a-152d to provide computing system 100 with the capability to restore a password-protected endpoint device to an operational state from a low power state. In particular, firmware 136 may use busses 126 and 152a-152d to transmit an endpoint device password to endpoint device 112 at a time after a transition from a wake event to an operational or active state is initiated but before OS application software is operational. Generally, busses 126 and 152a-152d are secure channels at an early stage of a transition to an operational state S0 from sleep state S0ix before OS application software is running. In addition, some or all system components of computing system 100 outside of controller 110 are initially not in an operational state when the endpoint device password is transmitted over busses 126 and 152a-152d. While various embodiments employ busses 126 and 152a-152d to transmit an endpoint device password at a time before computing system 100 is in a fully operational state, e.g., S0, after being in a sleep state so that busses 126 and 152 are generally secure channels, in other embodiments any suitable secure channel may be used. For example, in some embodiments, an endpoint device password may be encrypted prior to transmission over busses 126 and 152a-152d from controller 110 to endpoint device 112. As another example, a bus for transmitting an endpoint device password from controller 110 to endpoint device 112 that is not accessible by BIOS 104, OS 106, or other components may be employed.

In some embodiments, computing system 100 includes power management controller (PMC) 154. PMC 154 may control power supplied to controller 110, endpoint devices 112, and other components of computing system 100. In other words, PMC 154, by changing power supplied to a component or device of computing system 100, may control active and sleep states of the component or device. In some embodiments, PMC 154 receives a signal indicative of a wake event, and in response to the signal indicative of a wake event, PMC 154 brings up power to controller 110 and endpoint device 112. In addition, PMC 154 may receive a signal, e.g., from controller 110, indicating that endpoint device 112 is unlocked and operational. In response to the signal indicating that endpoint device 112 is unlocked and operational, PMC 154 may enable power to be supplied to other components of system 100.

Advanced Configuration and Power Interface (ACPI) is an open standard used by operating systems to manage power consumption in a computer system. ACPI specifies four global states: G0 (working), G1 (sleeping), G2 (soft off), and G3 (mechanical off). The specification also defines six sleep states. The G0 (working) global state has one sleep state: S0 in which the computer's CPU executes instructions. In G1 (sleeping) global state, five sleep states are possible: S0ix, S1, S2, S3, and S4. G2 (soft off) global state has one sleep state: S5. In sleep state S5, power is supplied to the computer's power-on button, but power is cut to all or almost all other components. In G3 (mechanical off) global state, power to all components of the computer system except the clock is cut. G3 global state has no sleep states.

S0ix is known as "Modern Standby" or "Low Power S0 Idle." Modern Standby comprises Screen Off and Sleep states. The Screen Off state includes processes to quiesce a computer system to sleep. In S0ix, the screen is turned off, application software stops executing, and parts of an SoC that are not in use are placed in a low or no power state. In Modern Standby, no OS software activity runs. Modern Standby allows the system to wake up very quickly when needed. Modern Standby starts, for example, when a user presses the power button, closes the lid, selects Sleep from a menu, or the system idles out. A hardware interrupt (e.g., wake event 228) causes the system to exit Modern Standby, e.g., user pressing the power button.

S1 is referred to as "Power on Suspend." In S1, the processor stops executing instructions and caches are flushed. In S1, power to the CPU and RAM is maintained, and power is cut to devices that do not indicate they must remain on. In S2, the CPU is powered off and a cache, if in a dirty state, is flushed to RAM. S3 state may be referred to as the "standby" or "sleep" state. In S3, power is maintained to RAM. In S4, all content of RAM is saved to a non-volatile memory and the computer system is powered down. S4 may be called "hibernation" or "suspend to disk."

In addition, ACPI specifies various power states for a computing system's device components: D0 (fully on), D1 and D2 (intermediate power states, definition varies by device), D3hot (auxiliary power provided to device) and D3cold (no power provided). D3hot is a sub-state of D3 that a device can enter directly from D0. A device makes a transition from D0 to D3hot under software control by the device driver. In D3hot, the device can be detected on the bus that it connects to. The bus must remain in the D0 state while the device is in the D3hot sub-state. From D3hot, the device can either return to D0 or enter D3cold. D3cold can be entered only from D3hot. D3cold is a sub-state of D3 in which the device is physically connected to the bus but the presence of the device on the bus cannot be detected (e.g., until the device is turned on again). In D3cold, one or both of the following is true: (1) The bus that the device connects to is in a low-power state; (2) The device is in a low-power state in which the device does not respond when the bus driver tries to detect its presence on the bus. When a computer system enters G1 (sleeping) global state and S0ix (Modern Standby) sleep state, various devices and components of a computer system that are not in use may be placed in a low power state, e.g. D3 hot or cold.

In some embodiments, computing system 100 and OS 106 support ACPI. While this description refers to the global and sleep states of a computer system and the power states of devices as specified by ACPI, it should be appreciated that embodiments are not limited to the ACPI system and device power states. In some embodiments, the principles described herein may be applied in any computing system that supports three or more power states for endpoint devices 112. In particular, the principles described herein may be applied where three or more power states for password-protected endpoint device 112 comprise: (1) a first power state in which the device is provided with less than full power and the provided power causes the device to enter a locked state; (2) a second power state in which the device is operational and provided with full power; and (3) a third power state in which the device is provided with less than full power and, if unlocked at the time it is provided with less than full power, the device stays in the unlocked state. In some embodiments, the first power state may be a power state in which zero power is supplied to the device, though this is not essential. In some embodiments, the third power state may be a low power state, though this is not essential.

In various embodiments, computing system 100 and OS 106 support ACPI system and device states, the first, second, and third power states described above, or another scheme of power states. Accordingly, when computing system 100 enters the G1 (sleeping) global state and the S0ix (Modern Standby) sleep state, an endpoint device that is not in use may be put in a D3 state (or the first or third power state). According to some embodiments, when endpoint device 112 loses power, it enters a locked state. Accordingly, in some embodiments, if endpoint device 112 is put in D3cold (or first power state) when computing system 100 enters Modern Standby, endpoint device 112 enters a locked state. Subsequently, when computing system 100 needs to use the endpoint device, e.g., computing system 100 transitions to S0, and power is supplied to endpoint device 112, the device will remain in the locked state and not enter an operational or active state until it is unlocked with a password. In order to use endpoint device 112, the password for the device must be obtained from a user interface.

In various embodiments, when computing system 100 exits Modern Standby, the user is required to re-enter a password to unlock the endpoint device. If computing system 100 is used over an extended period of time, e.g., several hours, computing system 100 may enter Modern Standby many times, with each return to G0 (working) state requiring the user to enter the device password. Requiring a user to repeatedly enter a device password may inconvenience the user.

This inconvenience may be avoided by specifying that when Modern Standby is entered, the endpoint device enters a low power state (or third power state) in which power is supplied to the endpoint device, e.g., D3hot, so that the device stays in an unlocked state. However, specifying that endpoint device 112 enter D3hot has several disadvantages. First, it causes endpoint device 112 to consume power when computing system 100 enters Modern Standby. In addition, there may be other components in computing system 100 that cannot enter D3cold when computing system 100 enters Modern Standby so long as endpoint device 112 is having power supplied to it. Accordingly, specifying that endpoint device 112 enter a low power state (e.g., D3hot) in which it stays unlocked instead of a low power state (e.g., D3cold) in which it is locked may cause other components in the system to consumer power during Modern Standby.

According to various embodiments, a password-protected endpoint device may be placed in D3cold (or first power state) and subsequently restored to an operational state, such as D1 (or second power state), without requiring a user to re-enter a password for the endpoint device.

Figure 2:
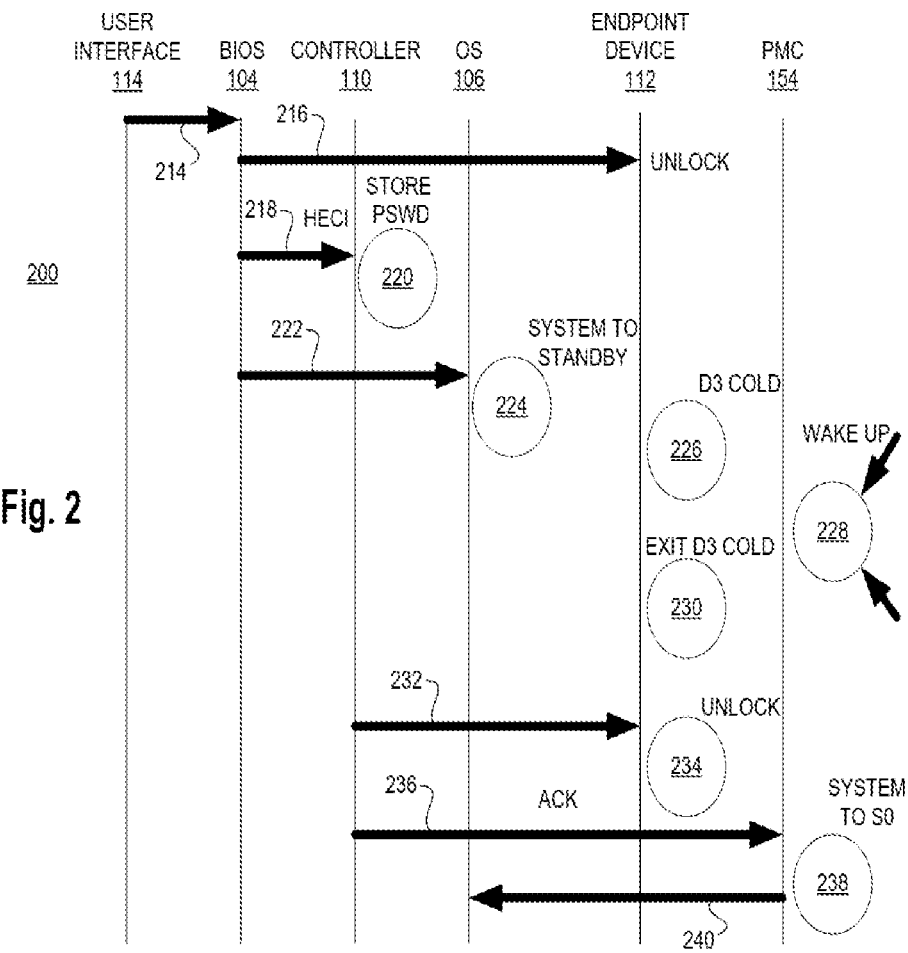
FIG. 2 illustrates a flow sequence diagram for restoring a password-protected endpoint device to an operational state from a low power state according to various embodiments.

FIG. 2 illustrates a flow sequence diagram 200 for restoring a password-protected endpoint device to an operational state from a low power state according to various embodiments. The sequence of actions of flow diagram 200 here can be modified. For example, some actions or processes can be performed in parallel and some actions can be performed out of order. The actions depicted in FIG. 2 involve user interface 114, BIOS 104, controller 110, OS 106, endpoint device 112, and PMC 154. At 214, BIOS 104 receives a password for endpoint device 112 from a user via user interface 114. At 216, BIOS 104 sends the password to endpoint device 112, e.g., an NVMe controller, to unlock endpoint device 112. At 218, BIOS 104 sends the password received from user interface 114 to controller 110 via a secure channel, e.g., HECI bus 151. At 220, controller 110 stores the password in a secure memory, e.g., secure partition 140 of flash memory 138. At 222, BIOS 104 boots OS 106 and a system, e.g., computing system 100, enters an operational or active state, e.g., S0. Subsequently, at 224, in some embodiments, the system enters Modern Standby, e.g., S0ix.

At 226, according to some embodiments, endpoint device 112 is placed in a low power state, e.g., D3cold. When endpoint device 112 is in D3cold, no power may be provided to the device and it enters a locked state. In some embodiments, endpoint device 112 is placed in another low power state in which the endpoint device enters a locked state even though the device is provided with some non-zero level of power. At 228, the computing system begins a wake-up process in response to an external wake event, e.g., a hardware interrupt. At 228, PMC 154 brings up power to controller 110 and endpoint device 112. At 230, with power restored, endpoint device 112 exits D3cold. Returning controller 110 to an operational state is an initial part of restoring the computing system as whole to an operational or active state, e.g., S0, however, at 228 and 230, the system as a whole is not yet operational. In particular, OS applications are not yet capable of running. In addition, while endpoint device 112 is supplied with power, it is locked. At 232, firmware 136 or other logic of controller 110 fetches the endpoint device password from secure memory partition 140, transmits the fetched password to endpoint device 112, e.g., via busses 126 and 152, and unlocks the endpoint device. In addition, at 232, firmware 136 may perform an operation for detecting that a password for the endpoint device is stored in secure memory 140. This detecting operation may be performed during the transition from the wake event 228 to an operational state of a computing system before OS applications are capable of running. At 234, endpoint device 112 is unlocked and enters a usable state. Advantageously, endpoint device 112 enters the usable state without the need for the user to reenter a password for the endpoint device. At 236, controller 110 transmits an acknowledgement to PMC 154, indicating that endpoint device 112 has been successfully restored for use. At 238, in various embodiments, in response to the acknowledgement from controller 110, PMC 154 supplies power to other components of the computing system 100. At 240, the boot process continues and OS applications may begin running.

Figure 3:
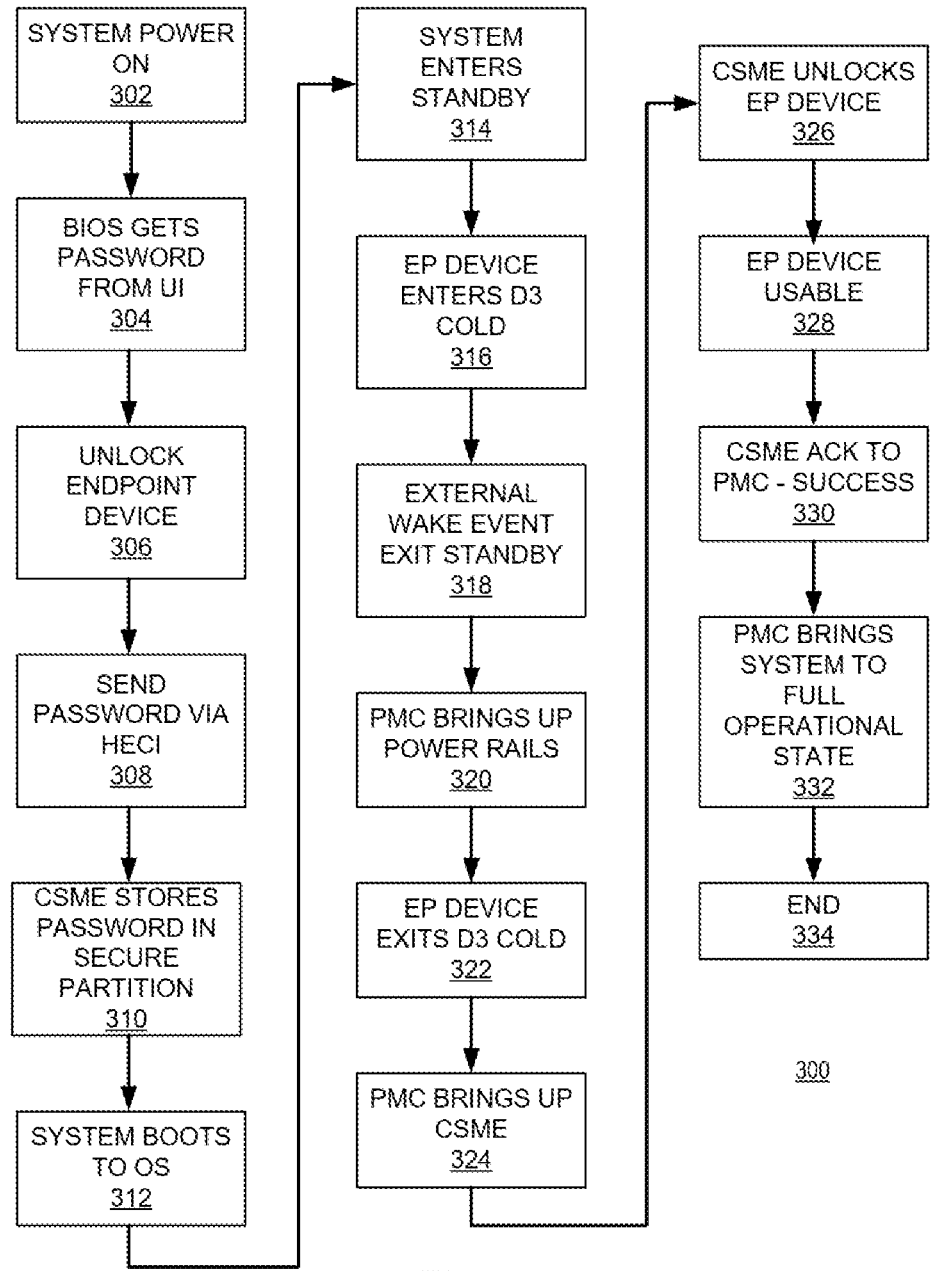
FIG. 3 is a flow diagram for restoring a password-protected endpoint device to an operational state from a low power state according to various embodiments.

FIG. 3 is a flow diagram 300 for restoring a password-protected endpoint device to an operational state from a low power state according to various embodiments. The sequence of actions of flow diagram 300 here can be modified. For example, some actions or processes can be performed in parallel and some actions can be performed out of order. At 302, a computer system, e.g., computing system 100, is powered on. At 304, BIOS 104 receives or gets a password for endpoint (EP) device 112, such as NVMe controller 116, from user interface (UI) 114 or another user input. At 306, BIOS 104 unlocks endpoint device 112 by transmitting the password to the endpoint device. According to various embodiments, at 308, BIOS 104 transmits or sends the password to controller 110 via HECI bus 126 or another secure channel. At 310, according to various embodiments, controller 110 stores the password in a secure area of memory that controller 110 may access, e.g., secure partition 140. In some embodiments, controller 110 stores the password in a secure area of memory that is not accessible by BIOS 104, OS 106, or application software. At 312, computer system 100 boots to OS. At 314, computer system 100 enters Modern Standby. At 316, the endpoint device 112 enters D3cold or other low power state that causes the endpoint device to lock. In addition, controller 110 enters D3 or other low power state. In some embodiments, controller 110 enters D3cold. At 318, an external wake event causes computer system 100 to start to exit from Modern Standby. At 320, a power management controller, e.g., PMC 154, brings up all power rails in the computer system. In some embodiments, the power management controller brings up fewer than all power rails in the computer system at 320. At 322, endpoint device 112 exits D3cold or other low power state. At 324, the power management controller brings up controller 110. At 326, according to some embodiments, the firmware 136 of controller 110 or other logic fetches the stored password from the secure memory, e.g., secure partition 140, where it is stored, provides the password to endpoint device 112 via a secure channel, e.g., busses 126 and 152a-152d before OS applications are running, and unlocks endpoint device 112. In addition, at 326, firmware 136 may perform an operation for detecting that a password for the endpoint device is stored in secure memory 140. This detecting operation may be performed during the transition from the wake event 228 to an operational state of a computing system before OS applications are capable of running. At 328, endpoint device 112, now being unlocked, enters a state where it is usable, e.g., D1. At 330, controller 110 acknowledges to PMC 154 that endpoint device 112 has been successfully restored to an operational or active state. At 332, PMC 154 brings computing system 100 to an operational state, e.g., S0. At 334, process 300 ends.

In an example embodiment, endpoint device 112 is an SSD and computing system 100 is an SoC that consumes power in D3hot and D3cold as set forth 112 in Table 1.

TABLE 1

| Power (mW) | D3hot | D3cold |
|---|---|---|
| SSD | 2.5 mW/3.0 Mw | 0 mW |
| SoC | 32 mW | 18 mW |

As seen from Table 1, placing the example endpoint device (SSD) in D3cold provides a power savings on the order of 2.5 mW-3.0 mW. Various components of the SoC may not enter D3cold if the SSD is in D3hot. However, when the SSD is placed in D3cold, these components of the SoC may also be placed in D3cold, providing an additional power savings on the order of 14 mW (32 mW-18 mW) in this example. It should be appreciated that the values Table 1 are for a particular endpoint device 112 and a particular computing system 100. The power consumption for D3hot and D3cold states will vary for different endpoint devices and different computing systems.

Elements of embodiments (e.g., flowchart with reference to FIG. 3) are also provided as a machine-readable medium (e.g., NVM 111) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, the various logic blocks are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with the sequence diagram of FIG. 2 or the flow diagram of FIG. 3 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the sequence flow diagrams of FIG. 2 and FIG. 3 (and/or various embodiments) are executed by the system or one or more components thereof.

In some embodiments, the program software code/instructions associated with reference to FIG. 2 and FIG. 3 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to FIG. 2 and FIG. 3 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, the machine-readable storage media includes machine-readable instructions stored thereon, that when executed, cause one or more machines to perform a method comprising controlling a power gate, coupled to a first power supply rail and a second power supply rail, according to a control signal, wherein the second power supply rail is coupled to a computing platform. In some embodiments, the method further comprises generating the control signal according to a match between a first biometric data stored in memory and second biometric data sensed by a biometric sensor. In some embodiments, the method further comprises turning off the power gate to cut off a second power on the second power supply rail when the first biometric data does not match with the second biometric data. In some embodiments, the method comprises turning on the power gate to provide the first power as a second power on the second power supply rail when the first biometric data substantially matches with the second biometric data. In some embodiments, the method comprises issuing an interrupt when the biometric sensor generates the second biometric data.

Figure 4:
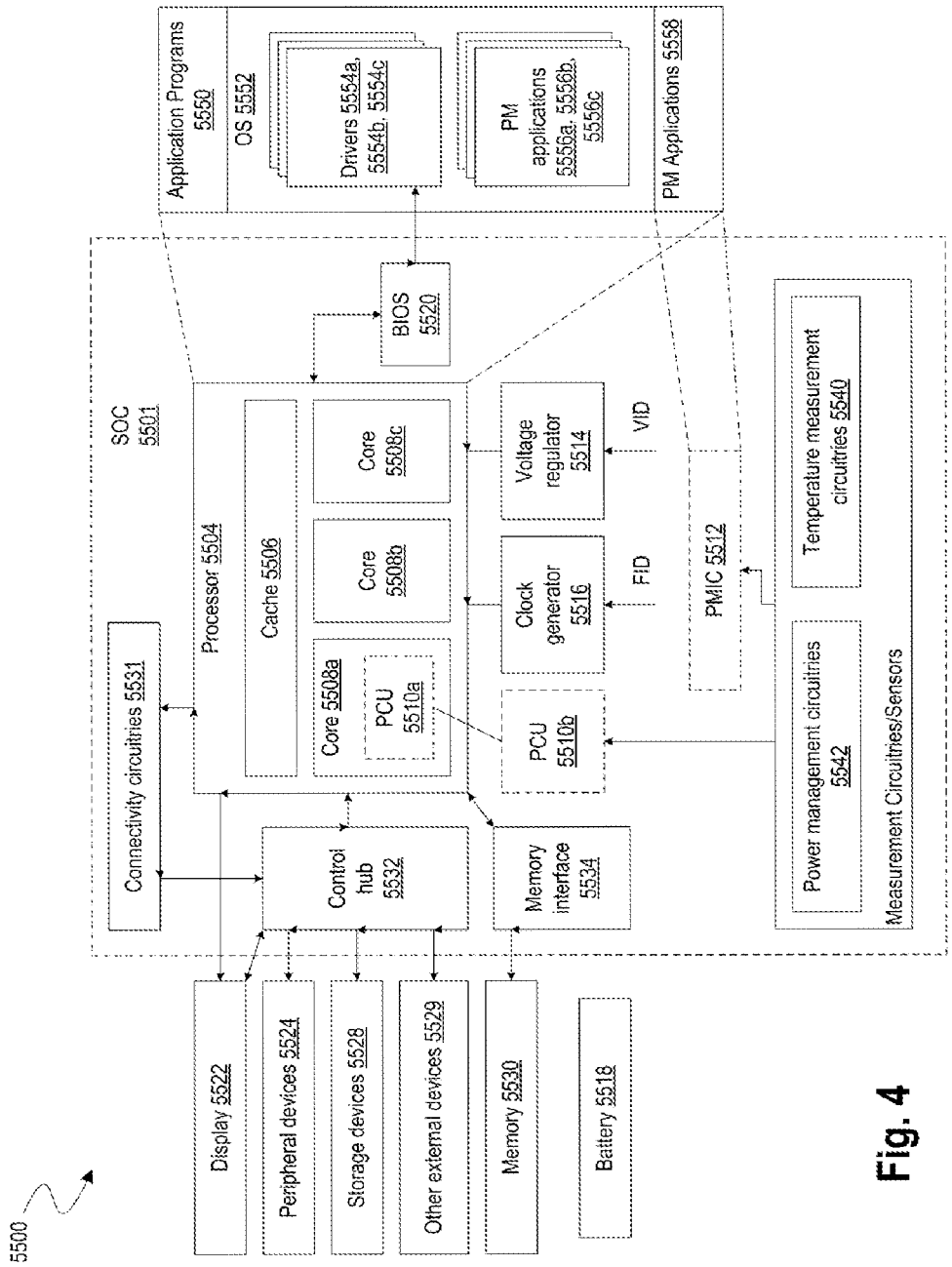
FIG. 4 illustrates a smart device or a computer system or an SoC (System-on-Chip) with a capability to restore a password-protected endpoint device to an operational state from a low power state, in accordance with some embodiments.

FIG. 4 illustrates a smart device or a computer system or an SoC (System-on-Chip) for restoring a password-protected endpoint device (e.g., a memory device) associated with the smart device or computer system to an operational state from a low power state, in accordance with some embodiments. It is pointed out that those elements of FIG. 4 having the same reference numbers (or names) as the elements of any other figure may operate or function in any manner similar to that described, but are not limited to such.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 4, with some example components being illustrated to be included within SoC 5501— however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 4, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as Memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.).

The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like. In some embodiments, one or more peripheral devices 5524 or storage devices 5528 are password-protected endpoint devices that may be restored to an operational state from a low power state according to the principles and techniques described herein.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices. In some embodiments, one or more of the devices 5529 are password-protected endpoint devices that may be restored to an operational state from a low power state according to the principles and techniques described herein.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, control hub 5532 comprises a controller that includes a flash memory having a secure partition. In some embodiments, the flash memory may be internal to controller, while in other embodiments, the flash memory may be external to controller and accessed via a bus, which may be a dedicated or shared bus. In some embodiments, the controller provides a computing environment that is isolated from software executing on the processor 5504, such as BIOS 5520, OS 5552, or application software. In various embodiments, the secure partition is not accessible by BIOS 5520, OS 5552, or application software. The controller may employ any suitable bus to provide computer system 5500 with the capability to restore a password-protected endpoint device to an operational state from a low power state. In particular, the controller may include firmware that may use a bus to transmit an endpoint device password to an endpoint device at a time after a transition from a wake event to an operational or active state is initiated but before OS application software is operational. The firmware may use the bus or busses at an early stage of a transition to an operational state S0 from sleep state S0ix before OS application software is running so that the bus or busses are generally secure channels. While various embodiments employ a controller included in control hub 5532 to use its secure memory partition to store a password for an endpoint device and to use the stored password to unlock the endpoint device, it will be appreciated that the controller may be included in any other suitable block (or in its own discrete block) of computer system 5500 in other embodiments.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection). In some embodiments, one or more of the memory devices 5530 are password-protected endpoint devices that may be restored to an operational state from a low power state according to the principles and techniques described herein.

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508*a*, 5508*b*, 5508*c*, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC

5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by PCU 5510 and/or PMIC 5512. OS 5552 may also include one or more PM applications 5556*a*, 5556*b*, 5556*c*. The OS 5552 may also include various drivers 5554*a*, 5554*b*, 5554*c*, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc. According to some embodiments, BIOS 5520 unlocks a password-protected endpoint device during an early stage of the boot process. In some embodiments, BIOS 5520 receives a password from a user interface and provides the password to a controller during an early stage of the boot process. In addition, BIOS 5520 may use a HECI bus to transmit a password for an endpoint device to the controller. In other embodiments, BIOS 5520 may use any other secure channel instead of a HECI bus.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510*a/b* has a capability to enable extra compute and telemetries resources for the runtime support of the pCode. Here pCode refers to a firmware executed by PCU 5510*a/b* to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance. Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in the platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, flow sequence diagram 200 for restoring a password-protected endpoint device to an operational state from a low power state may be implemented in computer system 5500. Similarly, in some embodiments, flow diagram 300 for restoring a password-protected endpoint device to an operational state from a low power state according to various embodiments may be implemented in computer system 5500. Some or all of the operations of flow sequence diagram 200 and flow diagram 300 may be represented in program software code/instructions that may be executed in the various components of computer system 5500 to implement the embodiments disclosed herein. In addition, some or all of the operations of flow sequence diagram 200 and flow diagram 300 may be represented in circuitry of computer system 5500 to implement the embodiments disclosed herein.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and I/O driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A machine-readable storage media having machine-readable instructions stored thereon, that when executed, cause one or more machines to perform a method comprising: detecting, during transition from a wake event to an operational state of a computing device, that a password for an endpoint device is stored in a secure memory of a first device; fetching the password for the endpoint device from the secure memory of the first device; and unlocking the endpoint device with the password for the endpoint device fetched from the secure memory.

Example 2: The machine-readable storage media of example 1, having machine-readable instructions stored thereon, that when executed, cause the one or more machines to perform the method, wherein the method further comprises: receiving the password for the endpoint device from a user interface; and transmitting the password to the first device using a bus.

Example 3: The machine-readable storage media of example 2, having machine-readable instructions stored thereon, that when executed, cause the one or more machines to perform the method, wherein transmitting the password for the endpoint device to the first device using the bus is at a time before a boot-up process for the computing device transfers control to an operating system of the computing device.

Example 4: The machine-readable storage media of example 2, having machine-readable instructions stored thereon, that when executed, cause the one or more machines to perform the method, wherein the method further comprises: storing the password for the endpoint device in the secure memory of the first device.

Example 5: The machine-readable storage media of example 1, having machine-readable instructions stored thereon, that when executed, cause the one or more machines to perform the method, wherein the secure memory of the first device is accessible by the first device and is not accessible by a Basic Input Output System (BIOS), an operating system, or application software of the computing device.

Example 6: The machine-readable storage media of example 1, having machine-readable instructions stored thereon, that when executed, cause the one or more machines to perform the method, wherein unlocking the endpoint device with the password for the endpoint device fetched from the secure memory comprises: transmitting the password for the endpoint device to the endpoint device.

Example 7: The machine-readable storage media of example 6, having machine-readable instructions stored thereon, that when executed, cause the one or more machines to perform the method, wherein transmitting the password for the endpoint device to the endpoint device is at a time after a transition from the wake event to an operational state is initiated but before an operating system supports running application software.

Example 8: The machine-readable storage media of example 1, having machine-readable instructions stored thereon, that when executed, cause the one or more machines to perform the method, wherein the method further comprises: providing the endpoint device with power according to a first power state prior to the unlocking the endpoint device with the password for the endpoint device fetched from the secure memory; and in response to the endpoint device being provided with power according to the first power state, the endpoint device entering a locked state, wherein the first power state provides less power than power provided according to a second power state, the second power state providing an amount of power sufficient for the endpoint device to be in an operational state.

Example 9: The machine-readable storage media of example 8, having machine-readable instructions stored thereon, that when executed, cause the one or more machines to perform the method, wherein the method further comprises: providing the endpoint device with power according to the second power state subsequent to the providing the endpoint device with power according to the first power state and prior to the unlocking the endpoint device with the password for the endpoint device fetched from the secure memory, wherein the endpoint device remains locked while in the second power state until the unlocking of the endpoint device with the password for the endpoint device fetched from the secure memory.

Example 10: An apparatus comprising: a first circuitry to detect, during transition from a wake event to an operational state of a computing device, that a password for an endpoint device is stored in a secure memory of the apparatus; a second circuitry to fetch the password for the endpoint device from the secure memory of the apparatus; and a third circuitry to unlock the endpoint device with the password fetched from the secure memory.

Example 11: The apparatus of example 10, further comprising: a fourth circuitry to receive the password for the endpoint device from a Basic Input Output System (BIOS) via a bus, wherein the password for the endpoint device is received at a time before a boot-up process for the computing device transfers control to an operating system of the computing device.

Example 12: The apparatus of example 11, a fifth circuitry to store the password for the endpoint device in the secure memory of the apparatus.

Example 13: The apparatus of example 10, wherein the secure memory of the apparatus is accessible by the apparatus and is not accessible by a Basic Input Output System (BIOS), an operating system, or application software of the computing device.

Example 14: The apparatus of example 10, further comprising: a sixth circuitry to transmit the password for the endpoint device to the endpoint device.

Example 15: The apparatus of example 14, wherein the sixth circuitry to transmit the password for the endpoint device to the endpoint device transmits the password for the endpoint device at a time after a transition from a wake event to an operational state is initiated but before an operating system of the computing device supports running application software.

Example 16: The apparatus of example 10, wherein the endpoint device comprises a memory device.

Example 17: A system comprising: an apparatus coupled to an endpoint device, the apparatus having a secure memory; a processor system coupled to the apparatus, wherein the processor system comprises a system-on-chip (SoC) having one or more processing cores; and a communication interface to allow the processor to communicate with another device, wherein the apparatus comprises: a first circuitry to detect, during transition from a wake event to an operational state of the system, that a password for the endpoint device is stored in the secure memory of the apparatus; a second circuitry to fetch a password for the endpoint device from the secure memory of the apparatus; and a third circuitry to unlock the endpoint device with the password fetched from the secure memory.

Example 18: The system of example 17, wherein the apparatus further comprises: fourth circuitry to receive the password for the endpoint device from a Basic Input Output System (BIOS) via a bus, wherein the password for the endpoint device is received at a time before a boot-up process for the system transfers control to an operating system of the system.

Example 19: The system of example 17, wherein the apparatus further comprises: fifth circuitry to transmit the password for the endpoint device to the endpoint device at a time after a transition from a wake event to an operational state is initiated but before an operating system of the system supports running application software.

Example 20: The system of example 17, wherein the endpoint device comprises a memory device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A non-transitory machine-readable storage media having machine-readable instructions stored thereon, that when executed, cause one or more machines to:
   begin a wake-up process for a computing device and an endpoint device when the computing device is in a sleep state and the endpoint device is in a first power state in which no power is provided to the endpoint device; and
   in the wake-up process:
      transition the computing device from the sleep state to an operational state;
      transition the endpoint device from the first power state to a second power state in which full power is restored to the endpoint device;
      fetch a password from a secure memory of the first computing device; and
      transmit the password fetched from the secure memory to the endpoint device to unlock the endpoint device.

2. The non-transitory machine-readable storage media of claim 1, wherein the password is transmitted to the endpoint device before a boot-up process for the computing device transfers control to an operating system of the computing device.

3. The non-transitory machine-readable storage media of claim 1, wherein an operating system of the computing device is to run on a processor of the computing device, and the secure memory is not accessible to the operating system.

4. The non-transitory machine-readable storage media of claim 1, wherein the secure memory is accessible by a controller of the computing device and is not accessible by a Basic Input Output System (BIOS), an operating system, or application software of the computing device.

5. The non-transitory machine-readable storage media of claim 1, wherein the password is transmitted to the endpoint device before operating system application software of the computing device is operational.

6. The non-transitory machine-readable storage media of claim 1, wherein the machine-readable instructions, when executed, cause the one or more machines to:
   when the endpoint device is unlocked in the second power state, transition the endpoint device from the second power state to a third power state in which a reduced power, less than the full power, is provided to the endpoint device;
   keep the endpoint device unlocked when the endpoint device transitions from the second power state to the third power state;
   transition the endpoint device from the third power state to the first power state; and
   lock the endpoint device when the endpoint device transitions from the third power state to the first power state.

7. The non-transitory machine-readable storage media of claim 6, wherein the machine-readable instructions, when executed, cause the one or more machines to:
   provide the endpoint device in the second power state subsequent to providing the endpoint device in the first power state and prior to the transmitting of the password to the endpoint device, wherein the endpoint device remains locked while in the second power state until the endpoint device is unlocked with the password.

8. The non-transitory machine-readable storage media of claim 1, wherein:
   the first power state in which no power is provided to the endpoint device is a D3 cold state.

9. The non-transitory machine-readable storage media of claim 1, wherein the machine-readable instructions stored, when executed, cause the one or more machines to:
   issue a command to the endpoint device, wherein the command is required by the endpoint device to unlock the endpoint device.

10. The non-transitory machine-readable storage media of claim 1, wherein the machine-readable instructions stored, when executed, cause the one or more machines to:
    transmit an acknowledgement to a power management controller indicating that the endpoint device has been successfully restored for use, wherein in response to the acknowledgement, the power management controller is to supply power to components of the computing device to bring the computing device to the operational state.

11. An apparatus, comprising:
    a power management controller to detect a wake event;
    an embedded controller comprising a secure memory to store a password; and
    an endpoint device coupled to the embedded controller by a bus, wherein:
       in response to detecting the wake event, the power management controller is configured to bring up power of the embedded controller from a sleep state to an operational state and to bring up power of the endpoint device from a powered-off state, in which the endpoint device is physically connected to the bus but a presence of the endpoint device on the bus cannot be detected, to a fully powered state; and when the embedded controller is in the operational state, the embedded controller is configured to fetch the password from the secure memory and to transmit the password to the endpoint device via the bus to unlock the endpoint device.

12. The apparatus of claim 11, wherein the powered-off state of the endpoint device is a D3 cold state.

13. The apparatus of claim 11, wherein the password is transmitted to the endpoint device before a boot-up process for the apparatus transfers control to an operating system of the apparatus.

14. The apparatus of claim 11, wherein the embedded controller is configured to issue a command to the endpoint device, and the command is required by the endpoint device to unlock the endpoint device.

15. The apparatus of claim 11, wherein the secure memory is accessible by the embedded controller and is not accessible by a Basic Input Output System (BIOS), an operating system, or application software of the apparatus.

16. The apparatus of claim 11, wherein the endpoint device comprises a memory device.

17. A system comprising:
an apparatus having a secure memory;
a processor system coupled to the apparatus, wherein the processor system comprises a system-on-chip (SoC) having one or more processing cores; and
a communication interface to allow the apparatus to communicate with an endpoint device, wherein the apparatus is configured to:
  detect, during a transition of the endpoint device from a powered-off state to a powered-on state, that a password for the endpoint device is stored in the secure memory;
  fetch the password from the secure memory; and
  unlock the endpoint device with the password fetched from the secure memory.

18. The system of claim 17, wherein the apparatus is configured to:
receive the password from a Basic Input Output System (BIOS) via a bus, wherein the password is received before a boot-up process for the system transfers control to an operating system of the system.

19. The system of claim 17, wherein the apparatus is configured to:
transmit the password to the endpoint device after the transition is initiated but before an operating system of the system supports running application software.

20. The system of claim 17, wherein the apparatus is to issue a command to the endpoint device, wherein the command is required by the endpoint device to unlock the endpoint device.

* * * * *